United States Patent [19]

Kirk

[11] Patent Number: 4,807,392
[45] Date of Patent: Feb. 28, 1989

[54] DOOR THRESHOLD POISON BAIT STATION APPARATUS AND METHOD

[76] Inventor: Bill L. Kirk, 2308 Enfield Rd., #102, Austin, Tex. 78703

[21] Appl. No.: 91,409

[22] Filed: Aug. 31, 1987

[51] Int. Cl.$^4$ .............................................. A01M 1/20
[52] U.S. Cl. ....................................... 43/131; 49/467; 49/58
[58] Field of Search ....................... 43/131, 131.2, 121; 49/467, 58

[56] References Cited

U.S. PATENT DOCUMENTS

| 2,340,255 | 1/1944 | Weil | 43/131 |
| 4,453,337 | 6/1984 | Williams | 43/131 |
| 4,550,525 | 11/1985 | Baker et al. | 43/131 |
| 4,563,836 | 1/1986 | Woodruff | 43/131 |
| 4,619,071 | 10/1984 | Willis | 43/131 |

FOREIGN PATENT DOCUMENTS 2010065 6/1979 United Kingdom ................. 43/131

Primary Examiner—Nicholas P. Godici
Assistant Examiner—Karen Skillman
Attorney, Agent, or Firm—J. Nevin Shaffer, Jr.

[57] ABSTRACT

A threshold poison bait station having an opening or openings in a threshold frame that are narrow in width and short in length. "V" shaped directing guides are connected to the openings thereby preventing direct, straight line access from interior openings to exterior openings and also thereby creating an enclosed insect access channel which directs insects along the channel to an interior poison bait receiving station. By extending one of the "V" shaped directing guides in length, a deep, dark, interior poison bait receiving station, which is very attractive to insects, is provided. While the device may be "armed" with the poison bait of the user's choice, little fear of contact with the poison bait by children or pets arises because the openings are so small yet so attractive to insects. In another form, a permanent division is placed dividing the threshold poison bait station in two and preventing access from the interior to the exterior, or vice versa, by insects. Nonetheless, the device would function as originally described. Also, removably insertable weather plugs are provided to temporarily or semi-permanently close any openings as may be desired.

20 Claims, 5 Drawing Sheets

DOOR THRESHOLD POISON BAIT STATION APPARATUS AND METHOD

BACKGROUND OF THE INVENTION

This invention relates to a unique threshold poison bait station for insects entering and/or leaving buildings.

The problem of insect control is a universal one. Huge businesses have been created around the preparation and sale of insecticides, repellents and poison baits. For numerous reasons, the direct application of poison in and around household and businesses is not preferable. Children, pets, and visitors may be exposed to toxic poisons through utilization of the direct application of sprays and baits. For these and other reasons, development of so called "insect traps" resulted. Alvarez, U.S. Pat. No. 3,704,539, developed a bait station for small bugs that utilizes a "unitary poison tablet, gel or the like" which is wrapped around a center post. The bait thereby, presumably, is exposed to bugs, but is more or less out of reach of children and pets. The Alvarez device is a small portable device that may be moved around to various locations throughout the house. The Woodruff et al. device, U.S. Pat. No. 4,563,836, is a circularly shaped container with bait in the middle. A see-through cover enables the user to determine whether bait replenishment is necessary. Access to the interior of the circular device is provided in a number of locations and there are a series of short broken walls that prevent direct access to the center of the circular device. This invention is also portable.

The primary focus of these prior art devices is to attract and poison insects that have already entered a house or business. Further, the devices are incapable of being placed in an area over which people will walk. Still further, these devices are ineffective in intercepting insects either entering or exiting a home through window or door thresholds. The primary reason for this is that the threshold is a precisely positioned device designed to mesh closely with windows and doors and to form a good seal against the undesired introduction of weather, insects, etc., into a building.

Thus, there is a need in the art for providing a poison bait station that may be utilized in areas receiving heavy foot traffic. There is further a need for a poison bait station that may be utilized in the intricate interface between doors and windows and the corresponding thresholds. Further, there is a need for a threshold poison bait device that will attract and poison insects both entering and exiting a building. It, therefore, is an object of this invention to provide a novel threshold poison bait station for intercepting insects entering and leaving a building.

SHORT STATEMENT OF THE INVENTION

Accordingly, the threshold poison bait station of the present invention includes a threshold sealing frame within which one or more openings are located. The openings in tee threshold frame are positioned along the frame edge and where one opening on the interior of a building is located, an oppositely positioned opening on the exterior of the building is also positioned. An interior poison bait receiving station is provided adjacent to the openings. A number of directing guides are attached to the openings providing a dual purpose of preventing direct, straight line access from the exterior opening to the interior opening and, further, defining the bait receiving station. Particularly important is the fact that the directing means create an interiorly located dark, recessed area from which the receiving station is created, and which is attractive to insects.

The openings in the threshold sealing frame are only as wide as that portion of the frame is wide that protrudes above the base of the threshold. The openings are approximately four times as long as they are wide. As a result, the openings may not be reached by small children or pets, but are amply wide enough and long enough to admit insects. A further embodiment of the invention is a provision of one or more pairs of openings in the frame along the length of said frame. There are additional embodiments as well, such as a permanent division between the exterior and the interior opening thereby enabling insects to enter into the recessed area in an attractive, dark location, but preventing complete access between the exterior to the interior. Additionally, weather plugs are provided that conform to the shape of the opening and may be inserted during time of inclement or extreme weather to prevent the introduction of the same into the building.

BRIEF DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF THE PREFERRED EMBODIMENT

The preferred embodiment of the present invention is illustrated by way of example in FIGS. 1-6. With specific reference to FIG. 1, a threshold poison bait station 10 includes threshold frame 12. Frame 12 is designed, as is known in the art, to fit snugly at the base of a doorway or window sill and to form a seal between the exterior of a building and the interior of a building. As every homeowner, apartment tenant, or businessman knows, insects are quick to find the easiest way into a building. Thresholds are the natural point of access for many crawling insects. In the present invention, device 10 utilizes frame 12 of standard design having curved contact top portion 14. Typically, top portion 14 is of a flexible, plastic rubber, or the like, substance so that when the door or window is closed, a compressible seal is formed between top portion 14 and the bottom of the door or window.

Figure 1:
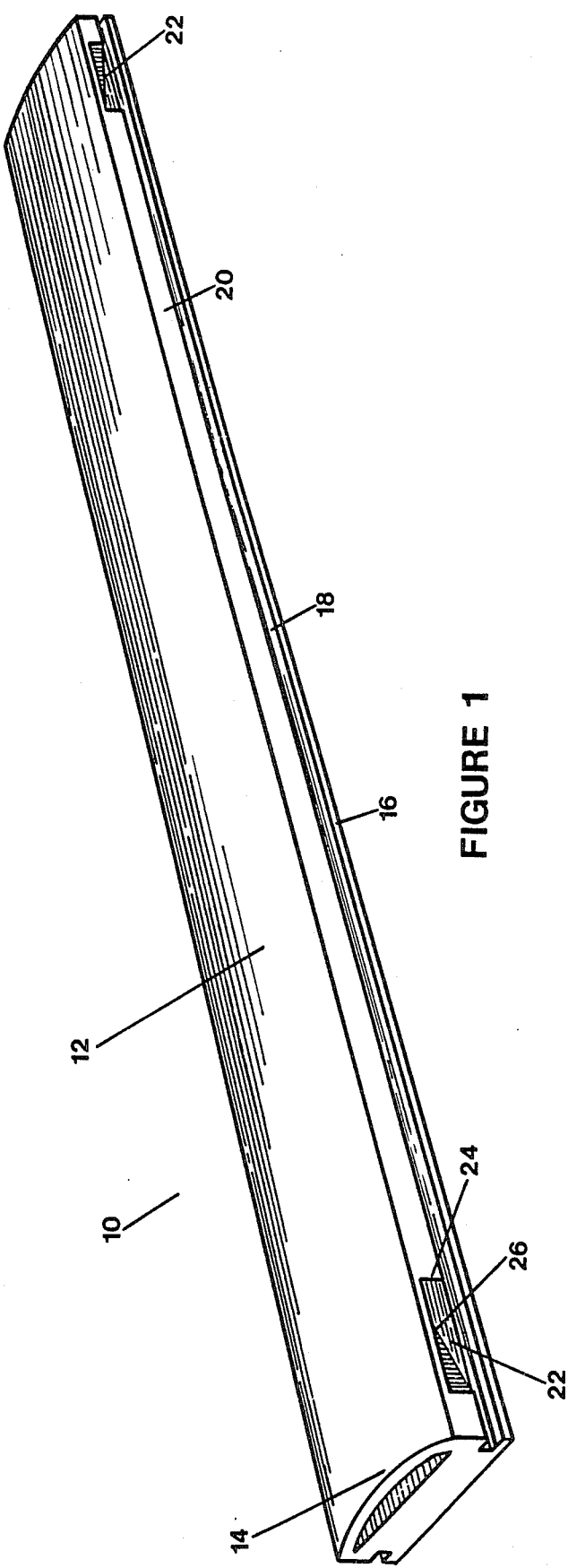
FIG. 1, is a plan view of a preferred embodiment of the threshold poison bait station of the present invention showing a threshold with two openings located in opposite ends of the threshold.

FIG. 1 clearly shows how a typical threshold frame is secured into position. Bottom plate 16 rests on the floor at the threshold. Retaining groove 18 receives an interlocking groove from the door sill or window sill so that a solid uniform connection between the threshold frame and the sill is provided. Directly above retaining groove 18 is frame width 20 to which top portion 14 is connected. Located in frame width 20 is opening 22, shown with openings at both ends of frame 12. As FIG. 1 illustrates, the width 24 of opening 22 substantially conforms to the width of frame width 20. The length 26 of opening 22 is approximately four times width 24.

Figure 2:
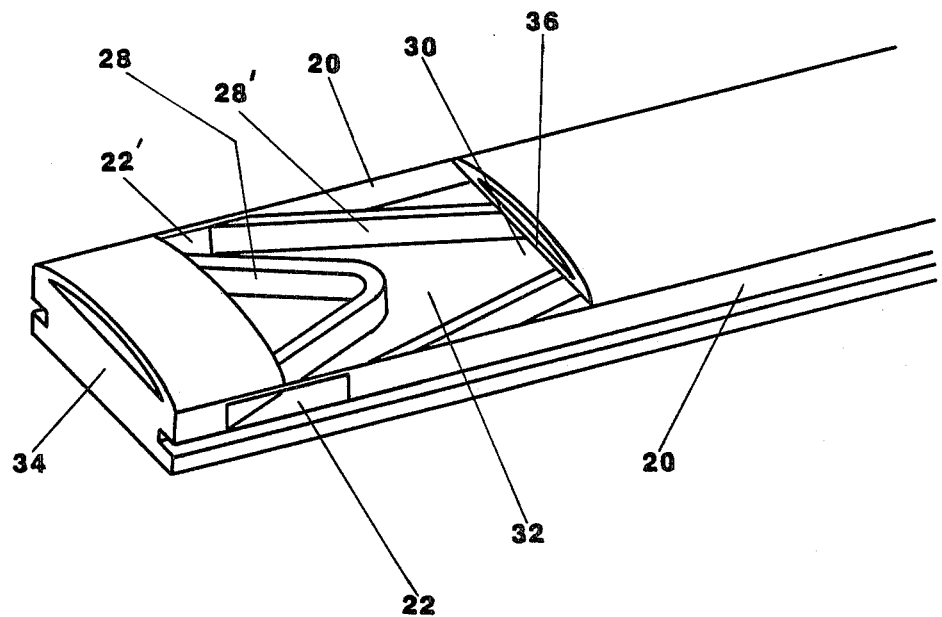
FIG. 2 is a partial section view of one end of the threshold frame with the top of the threshold frame partially broken away to reveal the interior directing means attached to the opening.

Referring to FIG. 2, "V" shaped directing guides 28 are shown. As illustrated, directing guides 28 are attached at one end to the edges of opening 22 and preventing the direct straight line access between opening 22 on the interior side of frame 12, and opening 22' (prime) on the exterior of accomplished by means of the "V" shaped directing guides 28. Also indicated in FIG. 2 is interior poison bait receiving station 30 adjacent to opening 22 and opening 22'. Without the "V" shaped directing guides 28, interior poison bait receiving station 30 would be formed by means of frame width 20 on both sides, the base 32 of frame 12, the end 34 of frame 12, and the bottom 36 of curved contact top portion 14.

Figure 3:
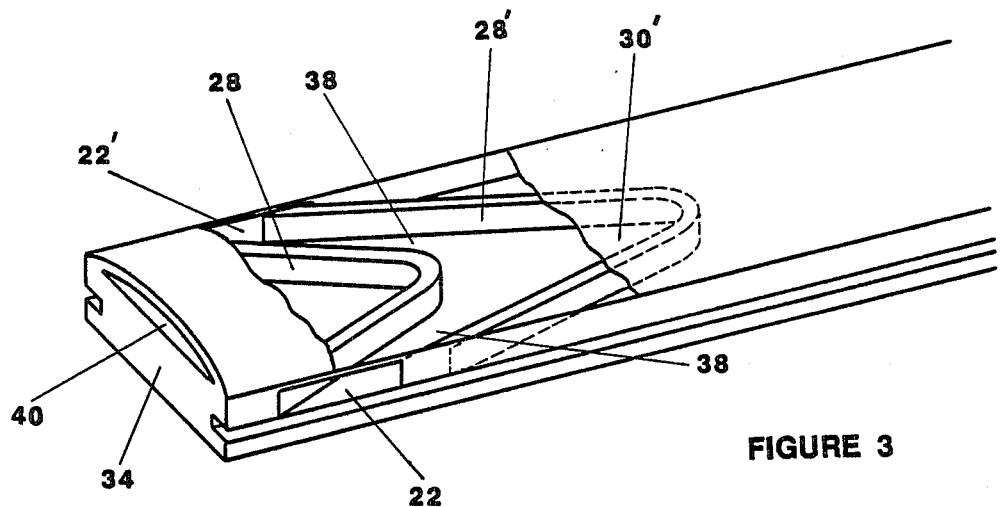
FIG. 3 is a partial section view with a part of the frame partially broken away to reveal the directing means and, in dotted lines, the farthest reach of the interior poison bait receiving station.

FIG. 3 shows how "V" shaped directing guides 28 create an enclosed insect access channel 38 from opening 22 and 22'. Further, it is clear from FIG. 3 that because "V" shaped directing guide 28' is longer than directing guide 28, that a deep, dark, bait receiving station 30', attractive to insects, is provided. Also, it is evident from FIG. 3 that with directing guides 28 and 28' in position, the sides of interior poison bait receiving station 30 are formed from guides 28 and 28' instead of frame width 20.

Figure 4:
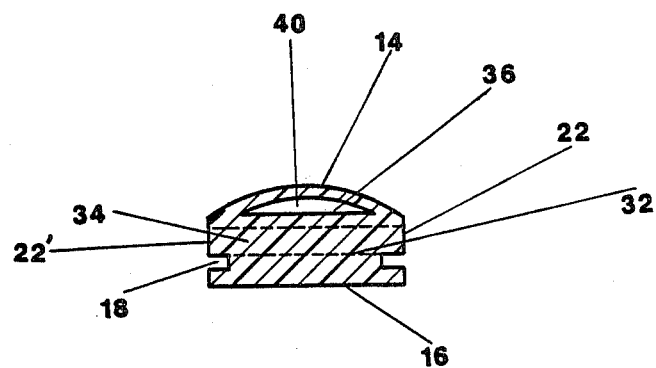
FIG. 4 is an end view of the threshold frame of the present invention.

Referring now to FIG. 4, the end of frame 12 is illustrated demonstrating bottom plate 16, retaining groove 18, base 32 and solid end 34. Also illustrated is curved contact top portion 14 and bottom 36. FIGS. 1, 2 and 3 also illustrate hollow area 40 between curved contact top portion 14 and bottom 36. Also shown, in dotted lines, is opening 22 and 22'.

Figure 5:
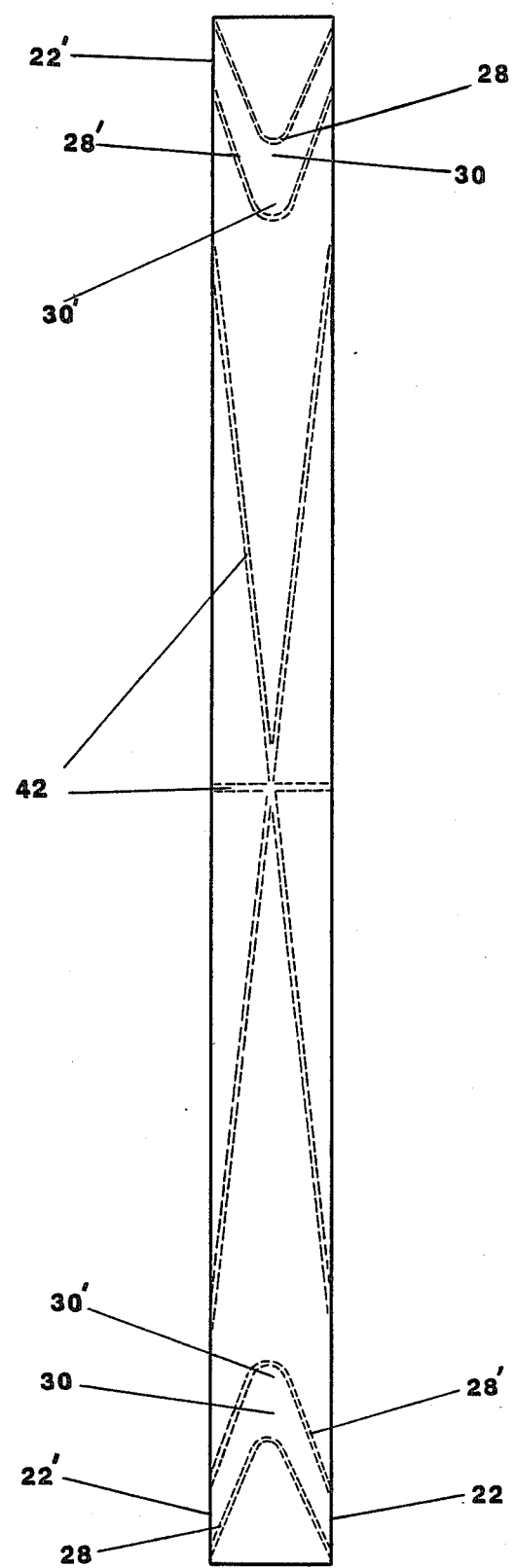
FIG. 5 is a top view of the frame of the invention showing, in dotted lines, the invention with openings in both ends of the frame and the interior strength members of the frame.

Referring now to FIG. 5, frame 12 is shown with opening 22 and 22' in both ends of frame 12. "V" shaped directing guides 28 and 28' are illustrated as would be assembled in a frame 12 with openings in two ends. Also illustrated are interior strength members 42 that provide threshold frame 12 with rigidity.

FIG. 5 clearly illustrates that a bug entering from the exterior side of frame 12 through opening 22' would be directed by the combination of "V" shaped directing guides 28 and 28' to interior poison bait receiving station 30 and the deep, dark, interior poison bait receiving station 30' attractive to insects. Bait (not shown) of any suitable kind may be introduced into frame 12 through opening 22 or 22'. Because opening 22 is of a small width and a relatively short length, it is apparent that no child or pet can reach the bait once located in bait receiving station 30 or 30'.

Figure 6:
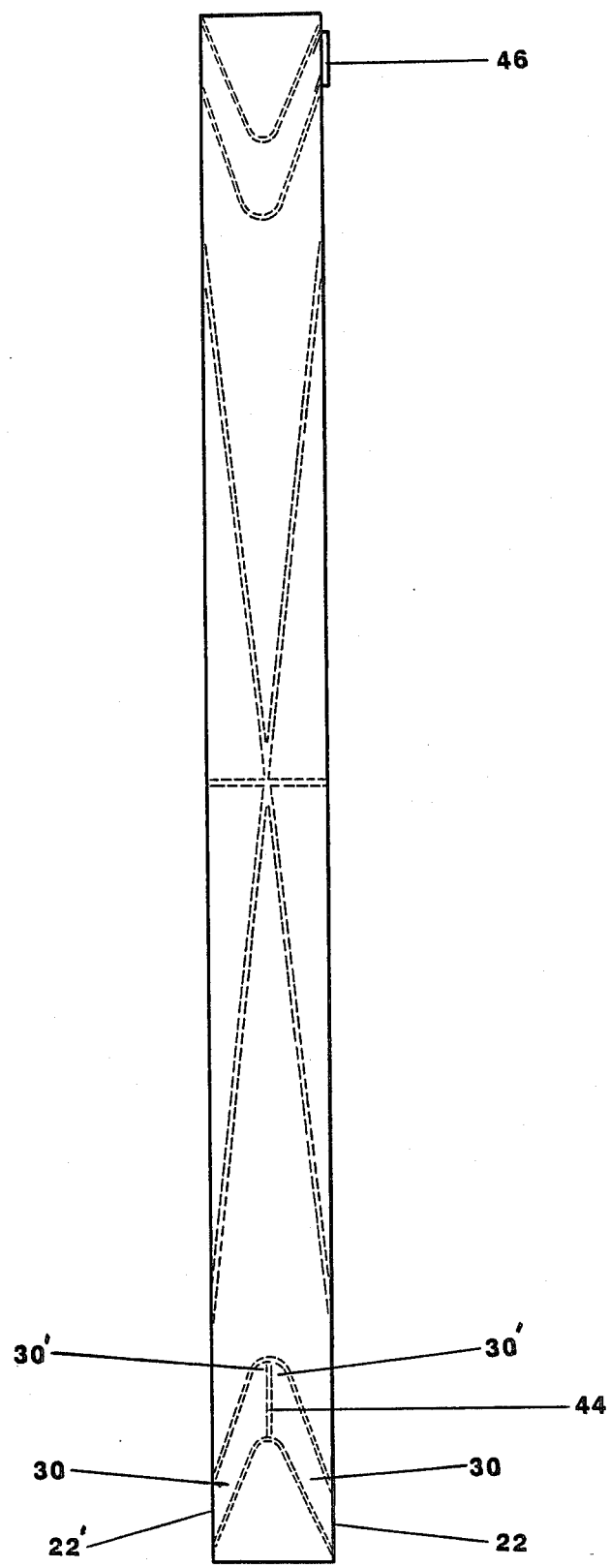
FIG. 6 is a top view of the device illustrating a permanent dividing means and replaceable weather plug.

Referring now to FIG. 6, permanent dividing section 44 is illustrated. Permanent dividing section 44 may be used where direct access from opening 22 to opening 22' is not desired. Threshold poison bait station 10 would work in all respects the same as the preferred embodiment except that the through access from one side to another would be prohibited.

FIG. 6 also illustrates the use of removably insertable weather plug 46 that may be used to temporarily plug opening 22 and 22', if desired.

In operation, threshold poison bait station 10 is created from door and window sill thresholds ordinarily known in the art. Opening 22 on the interior of frame 12 is provided with an oppositely positioned exteriorly located opening 22'. Straight through access from opening 22 to opening 22', is provided unless and until "V" shaped directing guides 28 and 28' are positioned. Once in position, guides 28 and 28' create enclosed insect access channels 38 which direct insects to bait (not shown) located in interior poison bait receiving station 30 and most attractively in deep, dark interior poison bait receiving station 30'. Insects which will proceed through the path of least resistance will be attracted to openings 22 and 22'. Once within opening 22 and 22', they will proceed down enclosed insect access channel 38 and encounter bait positioned within interior poison bait receiving station 30 and, once again, most attractively in deep, dark interior poison bait receiving station 30'. Because the openings 22 and 22' in frame 12 are so small, no true breach of security is provided, nor is access possible to the bait by children or pets. As a result, threshold poison bait station 10 may function as described in the preferred embodiment.

It may be, however, that a slightly modified version of bait station 10 may be desirable in specific instances. In this case, permanent dividing section 44, as shown in FIG. 6, may be provided that permanently divides the poison bait station 10 into two separate and equal sections admissible through openings 22 and 22'. The only difference is that insects entering opening 22' from the outside would be prohibited from proceeding through to opening 22 on the interior. Nonetheless, once again, the device 10 would function in the same manner in that bait would be deposited in interior poison bait receiving station 30 and most particularly and attractively in deep, dark, station 30'.

A further modification is provided by the use of removably insertable weather plug 46. Any or all of the openings 22 or 22' may be temporarily or semi-permanently closed by plug 46. In time of inclement weather, such as freezing rain, snow, etc., a plurality of the plugs 46 may be utilized to keep the harsh weather outside. Additionally, they may be used when the house is being left unattended for long periods of time and attention to refilling of bait might not be possible. With regard to the refilling of bait, it is anticipated that this may be done by the simple method of placing the suction end of a vacuum cleaner against opening 22 or 22' and sucking any dead insects and used bait out. It is not anticipated that many dead insects will be found within flame 12 because of the use of slow acting poison that is ingested first and causes death some period of time thereafter. Then, fresh bait may be applied in desirable manner.

As a result, a unique insect poison bait station is provided that assures that the area most likely to be utilized by insects entering a home is guarded in such a way as to ensure that insects utilizing that method of entrance or exit from the home will be exposed to poison bait and thereby terminated.

While the present invention has been disclosed in connection with the preferred embodiment thereof, it should be understood that there may be other embodiments which fall within the spirit and scope of the invention as defined by the following claims.

What is claimed is:

1. A threshold poison bait station comprising:
   A. a threshold sealing frame;
   B. an opening through said frame;
   C. an interior poison bait receiving station adjacent to said opening; and
   D. directing means attached to said opening for guiding insect to bait in said station.

2. The threshold poison bait station of claim 1 wherein said opening comprises:
   A. a first opening in a first end of said frame conformed to the width of said frame and about four times said width in length so that a long narrow opening provides access to said insects only; and
   B. a second opening in said first end oppositely positioned on said frame from said first opening conformed in width and length to said first opening so that said opening straight through said frame is provided.

3. The threshold poison bait station of claim 2 wherein said opening further comprises a second pair of openings, in conformity with said first and second openings, positioned in a second end of said frame.

4. The threshold poison bait station of claim 3 wherein said receiving station comprises:
   A. in said frame, an interiorly located space with a top cover formed from the top of said frame;
   B. a base formed from the base of said frames;
   C. sides formed from the sides of said frame; and
   D. a receiving station for bait accessible through said connection to said opening for bait deposition and removal.

5. The threshold poison bait station of claim 4 wherein said directing means comprises:
   A. a first directional guide connected to one edge of said first and second openings and to said top and base of said frame; and
   B. a second directional guide connected to a second edge of said first and second openings and to said top and base of said frame thereby creating an enclosed insect access channel and further defining said bait receiving station.

6. The threshold poison bait station of claim 5 wherein said directing means comprises:
   A. a "V" shaped first directional guide connected so that direct straight line access between said first and second openings is prevented; and
   B. a longer "V" shaped second directional guide connected so that a deep, dark, bait receiving station attractive to insects is provided.

7. The threshold poison bait receiving station of claim 5 wherein said directing means further comprises a center dividing section connected midway between said directional guides so that two totally separate sides of said bait receiving station are provided and direct access from one opening to another is prevented.

8. The threshold poison bait receiving station of claim 6 wherein a plurality of removably insertable weather plugs are provided that just conform to said openings so that said openings may be temporarily closed.

9. A threshold poison bait station comprising:
   A. a threshold sealing frame;
   B. a first opening in a first end of said frame conformed to the width of said frame and about four times said width in length so that a long narrow opening provides access to insects only;
   C. a second opening in said first end oppositely positioned on said frame from said first opening conformed in width and length to said first opening so that an opening straight through said frame is provided;
   D. in said frame, an interiorly located space with a top cover formed from the top of said frame;
   E. a base formed from the base of said frame;
   F. sides formed from the sides of said frame;
   G. a receiving station for bait accessible through said connection to said opening for bait deposition and removal;
   H. a first directional guide connected to one edge of said first and second openings and to said top and base of said frame; and
   I. a second directional guide connected to a second edge of said first and second openings and to said top and base of said frame thereby creating an enclosed insect access channel and further defining said bait receiving station.

10. The threshold poison bait station of claim 9 wherein said opening further comprises a second pair of openings, in conformity with said first and second openings, positioned in a second end of said frame.

11. The threshold poison bait station of claim 10 wherein said directing means comprises:
    A. a "V" shaped first directional guide connected so that direct straight line access between said first and second openings is prevented; and
    B. a longer "V" shaped second directional guide connected so that a deep, dark, bait receiving station attractive to insects is provided.

12. The threshold poison bait receiving station of claim 11 wherein said directing means further comprises a center dividing section connected midway between said directional guides so that two totally separate sides of said bait receiving station are provided and direct access from one opening to another is prevented.

13. The threshold poison bait receiving station of claim 12 wherein a plurality of removably insertable weather plugs are provided that just conform to said openings so that said openings may be temporarily closed.

14. A method of providing a threshold bait station comprising the steps of:
    A. constructing a threshold sealing frame;
    B. providing an opening through said frame;
    C. constructing an interior poison bait receiving station adjacent to said opening;
    D. depositing bait in said station; and
    E. attaching directing means to said opening so that insects are guided to said bait.

15. The method of providing a threshold bait station of claim 14 wherein providing an opening further comprises the steps of:
    A. conforming the height of a first opening in a first end of said frame to the width of said frame and the length to about four times said width so that a long narrow opening providing access for insects only is created; and
    B. oppositely positioning a second opening in said first end of said frame conformed in width and length to said first opening so that said opening straight through said frame is provided.

16. The method of providing a threshold bait station of claim 15 comprising the further step of adding a second pair of openings, in conformity with said first and second openings, in a second end of said frame.

17. The method of providing a threshold bait station of claim 16 wherein constructing an interior poison bait receiving station comprises the steps of:

A. creating an interiorly located space with a top cover formed from the top of said frame;

B. forming a base for said space from the base of said frame; and

C. forming sides of said space from sides of said frame, adjacent to said openings so that a receiving station for said bait accessible through said openings, is provided.

18. The method of providing a threshold bait station of claim 17 wherein attaching directing means comprises the steps of:

A. connecting a first directional guide to one edge of said first and second openings and to said top and base of said frame; and B. connecting a second directional guide to a second edge of said first and second openings and to said top and base of said base thereby creating an enclosed insect access channel and further defining said interior poison bait receiving station.

19. The method of providing a threshold bait station of claim 18 wherein attaching said directing means comprises the steps of:

A. blocking said first and second openings by constructing said first directional guide in a "V" shape; and B. creating a deep, dark, bait receiving station attractive to insects by constructing said second directional guide in a longer "V" shape.

20. A method of providing a threshold bait station comprising the steps of:

A. constructing a threshold sealing frame;

B. conforming the height of a first opening in a first end of said frame to the width of said frame and the length to about four times said width so that a long narrow opening providing access for insects only is created;

C. oppositely positioning a second opening in said first end of said frame conformed in width and length to said first opening so that an opening straight through said frame is provided;

E. constructing an interior poison bait receiving station adjacent to said opening;

F. creating an interiorly located space with a top cover formed from the top of said frame;

G. forming a base for said space from the base of said frame;

H. forming sides of said space from sides of said frame, adjacent to said openings so that a receiving station for said bait accessible through said openings is provided;

I. depositing bait in said station;

J. attaching directing means to said opening so that insects are guided to said bait;

K. blocking said first and second openings by constructing said first directional guide in a "V" shape; and L. creating a deep, dark, bait receiving station attractive to insects by constructing said second directional guide in a longer "V" shape.

* * * * *